UNITED STATES PATENT OFFICE.

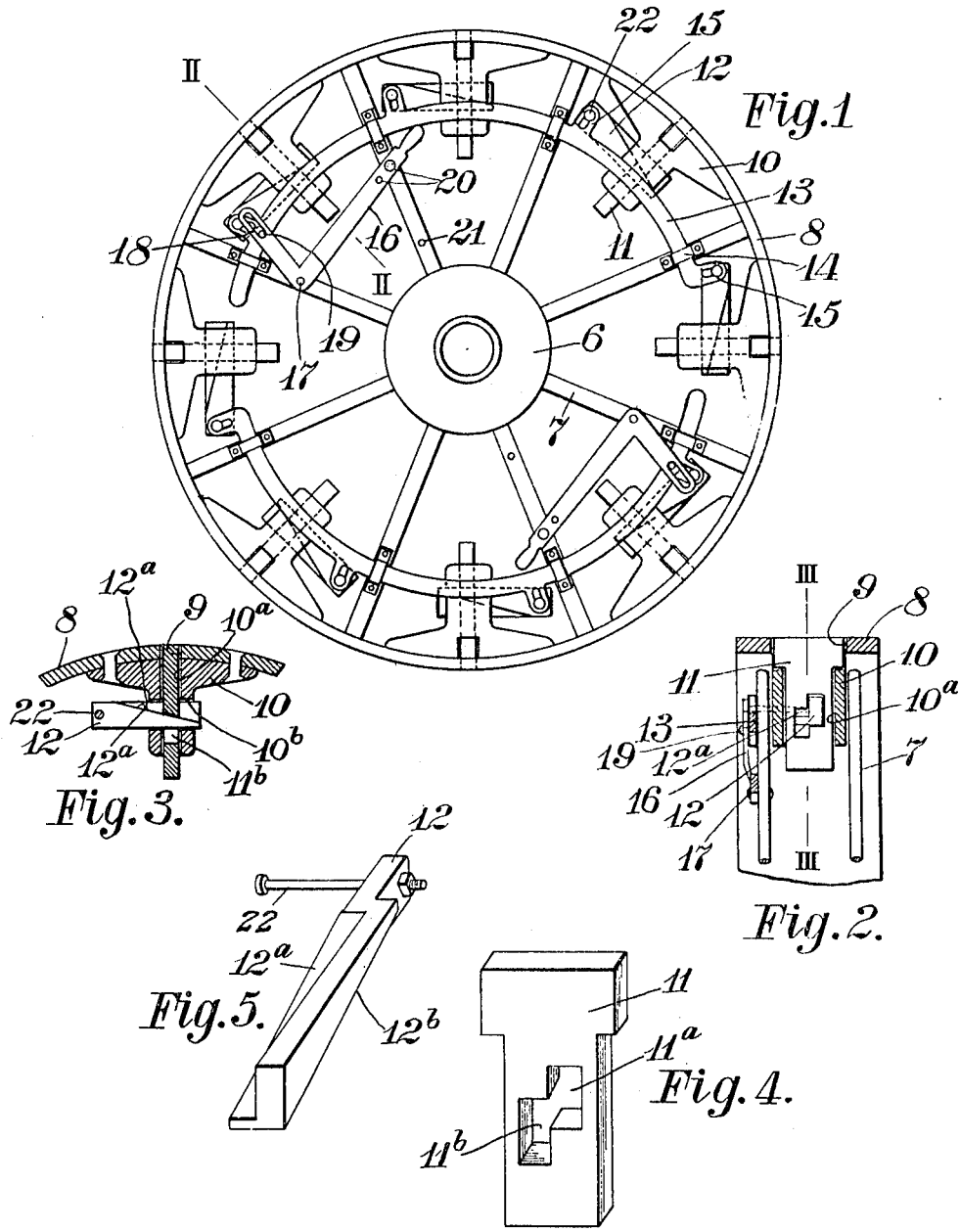

GEORGE L. HEMPY, OF TRURO TOWNSHIP, FRANKLIN COUNTY, OHIO, ASSIGNOR OF ONE-HALF TO ORLA H. MOSIER, OF COLUMBUS, OHIO.

TRACTION-WHEEL.

1,309,521.   Specification of Letters Patent.   Patented July 8, 1919.

Application filed January 20, 1919. Serial No. 271,938.

*To all whom it may concern:*

Be it known that I, GEORGE L. HEMPY, a citizen of the United States, residing at Truro township, in the county of Franklin and State of Ohio, have invented a certain new and useful Improvement in Traction-Wheels, of which the following is a specification.

The invention relates more particularly to traction wheels of the species containing lugs or traction elements adapted to be projected beyond the rim of the wheel for the purpose of affording a non-slipping grip on the ground.

The object of the invention is an improved and simplified construction whereby the operation of the lugs is made easier and the parts more susceptible of economical repair or replacement.

The invention is embodied in the example herein illustrated and described, the features of novelty being finally claimed.

In the accompanying drawing—

Figure 1 is a view in elevation of the outer side of a wheel equipped with the invention.

Fig. 2 is a cross section of the rim at the line II—II Fig. 1 looking to the left.

Fig. 3 is a section on the line III—III Fig. 2.

Fig. 4 is an isometric perspective on a larger scale of the lug or traction element.

Fig. 5 is a similar view of the member for directly actuating the lug or traction element.

In the views 6 designates the hub, 7 the spokes and 8 the rim of a traction wheel, these parts being of any suitable construction. The rim has cut or formed in it between the spokes a suitable number of transverse slots 9 and riveted to the inner side of the rim for each of said slots is a housing 10 having a passage $10^a$ alining radially of the wheel with the slot. The neck of the housing 10 has a cross passage $10^b$ intersecting at right angles said radially extending passage $10^a$. Located in each of the passages $10^a$ is the shank of the lug or traction element 11, that element being preferably formed with a head of greater width than the corresponding width of the shank. In the shank of the traction element or lug is formed a double or compound slot $11^a$, $11^b$, the parts of which are connected by an opening, and through this slot and the cross passage $10^b$ in the housing 10 is inserted a compound or double wedge member 12, said member being sustained and guided by the housing. The wedge member 12 has at one side an edge $12^a$ that bears against the shank of the lug at the outer end of the slot $11^b$ and said wedge member has at the opposite side an inclined edge $12^b$ that bears against the shank at the inner end of the slot $11^a$ so that when the wedge member is moved sufficiently in one direction—to the right as shown in Fig. 3—the traction lug is projected beyond the rim of the wheel and when moved in the opposite direction or to the left said lug is drawn inward so as not to project beyond said rim. The other edges of the wedge block are parallel to fit and move in a right line through the cross passage $10^b$ of the neck of the housing so that when the traction lug is projected the latter is firmly supported by the wedge member in all positions.

I have shown the wheel equipped with eight of the traction elements, but the number to be employed in connection with any given wheel may be varied as desired. It is an important feature of my improvement that a plurality of the traction elements, less than the whole number, be provided with means for simultaneously operating them. The reason for this is that it is impracticable to project that traction element or lug or those traction elements that are nearest the ground without first lifting the engine and wheels off the ground. In the instance shown I have provided means for simultaneously operating the traction elements in groups of four. Said means includes a curved bar 13 mounted to slide in retaining members 14 embracing the bar, said retaining members being applied to the spokes. The bar 13 has several slotted extensions 15 each engaging a pin 22 on the corresponding wedge member 12. The slotted extensions 15 permit a rectilinear movement of the wedge member notwithstanding the curvilinear movement of the bar 13. The means for shifting the bar 13 consists of a bell-crank lever 16 fulcrumed at 17 on one of the spokes of the wheel, the shorter arm of said lever having a slot 18 engaging a pin 19 on the bar 13 while the longer arm of said lever has suitable holes as at 20 to permit the insertion of a locking pin through it and a corresponding hole 21 in the spoke to hold said lever at the limits of its movements. The outer position of the longer arm of the lever 16 holds the traction elements or lugs withdrawn and the inner position of that lever holds them projected into working position.

The device as thus constructed can be applied to many if not all the traction wheels now in common use and it is capable of ready and economical repair. A worn or damaged traction element or lug can be removed and the housing can be replaced with a new one by removing its securing rivets.

In practice that group of traction elements which is uppermost will be first projected and when the engine has moved to bring the other group uppermost that group will be projected. Oftentimes it will be sufficient to project one group only as where the difficult place is of small area.

The parts are susceptible of some modification without departure from the invention as claimed.

What I claim is:

1. In combination with a wheel having a slotted rim, a housing attached to the rim at said slot, said housing having a passage radial with reference to the wheel for the reception of a traction lug and a cross passage for an actuating member for said lug extending in a plane coinciding with the plane of the wheel, a traction lug in said radial passage, a separate lug actuating member in said cross passage for actuating said traction lug, said lug actuating member being movable in a right line and in a plane coinciding with the plane of the wheel, and means for actuating said lug actuating member.

2. In combination with a wheel having a slotted rim, a housing attached to the rim at said slot and having a passage for a traction lug and a cross passage for an actuating member therefor, a traction lug, a wedge actuating member therefor, means for actuating the wedge member having a curvilinear movement and means whereby a rectilinear movement is imparted to the lug actuating member.

3. In combination with a wheel having a plurality of slots in its rim, a plurality of housings attached to the rim at said slots, said housings each having a passage radial with reference to the wheel for the reception of a traction lug and a cross passage for an actuating member for said lug extending in a plane coinciding with the plane of the wheel, a traction lug in each of said radial passages, a separate wedging member in each of said cross passages for actuating the traction lug, said lugs being movable in a plane coinciding with the plane of the wheel, a bar 13 mounted on the wheel to move in a curved path on the wheel, and removable means engaging said bar with said wedging members whereby a plurality of them may be actuated by movement of the bar.

GEORGE L. HEMPY.